United States Patent
Kim et al.

(10) Patent No.: US 10,978,759 B2
(45) Date of Patent: Apr. 13, 2021

(54) BATTERY MODULE HAVING IMPROVED COOLING PERFORMANCE

(71) Applicant: LG CHEM, LTD., Seoul (KR)

(72) Inventors: Dong-Yeon Kim, Daejeon (KR); Jin-Hak Kong, Daejeon (KR); Yong-Seok Choi, Daejeon (KR); Jong-Hyun Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 50 days.

(21) Appl. No.: 16/421,209

(22) Filed: May 23, 2019

(65) Prior Publication Data

US 2019/0280258 A1    Sep. 12, 2019

Related U.S. Application Data

(63) Continuation of application No. 15/555,741, filed as application No. PCT/KR2016/010099 on Sep. 8, 2016, now Pat. No. 10,347,880.

(30) Foreign Application Priority Data

Sep. 8, 2015 (KR) .................. 10-2015-0127129

(51) Int. Cl.
*H01M 50/20*    (2021.01)
*H01M 10/625*   (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .. H01M 2/10; H01M 10/6555; H01M 10/625; H01M 10/647; H01M 10/613; H01M 50/20
See application file for complete search history.

(56) References Cited

U.S. PATENT DOCUMENTS

2010/0279152 A1   11/2010   Payne
2011/0027640 A1   2/2011    Gadawski et al.
(Continued)

FOREIGN PATENT DOCUMENTS

CN   102414905 A   4/2012
CN   102473979 A   5/2012
(Continued)

OTHER PUBLICATIONS

Machine translation of KR 10-2014-0110233, published Sep. 17, 2014.
(Continued)

*Primary Examiner* — Matthew J Merkling
(74) *Attorney, Agent, or Firm* — Birch, Stewart, Kolasch & Birch, LLP

(57) ABSTRACT

A battery module according to an aspect of the present disclosure includes a cooling plate provided in a plate shape and having a plurality of slits at respective predetermined positions, a plurality of battery cells uprightly disposed parallel to one another in one direction on the cooling plate, and a plurality of cooling fins, each cooling fin having a wall surface uprightly disposed over the cooling plate to come into contact with one surface of the battery cell and a lower flange integrally formed with the wall surface and disposed through the slit of the cooling plate to come into contact with a bottom surface of the cooling plate, the plurality of cooling fins spaced apart by a predetermined distance from one another and arranged between the plurality of battery cells.

12 Claims, 6 Drawing Sheets

(51) Int. Cl.
*H01M 10/6551* (2014.01)
*H01M 10/6554* (2014.01)
*H01M 10/613* (2014.01)
*H01M 10/647* (2014.01)
*H01M 10/6555* (2014.01)
*H01M 10/6556* (2014.01)

(52) U.S. Cl.
CPC ..... *H01M 10/647* (2015.04); *H01M 10/6551* (2015.04); *H01M 10/6554* (2015.04); *H01M 10/6555* (2015.04); *H01M 10/6556* (2015.04); *H01M 2220/20* (2013.01)

(56) References Cited

U.S. PATENT DOCUMENTS

| | | | |
|---|---|---|---|
| 2012/0009455 A1 | 1/2012 | Yoon | |
| 2012/0270075 A1 | 10/2012 | Fujimura | |
| 2013/0130086 A1* | 5/2013 | Schaefer | H01M 10/6555 429/120 |
| 2014/0227575 A1* | 8/2014 | Ketkar | H01M 10/655 429/120 |
| 2014/0234691 A1 | 8/2014 | Lee et al. | |
| 2016/0036019 A1* | 2/2016 | Gunna | B60L 50/64 429/50 |
| 2016/0087319 A1 | 3/2016 | Roh et al. | |
| 2016/0118699 A1 | 4/2016 | Kim | |
| 2017/0331164 A1 | 11/2017 | Kwon | |
| 2018/0019508 A1 | 1/2018 | Lee et al. | |
| 2018/0062225 A1 | 3/2018 | You et al. | |
| 2018/0175468 A1* | 6/2018 | Shin | H01M 10/6556 |
| 2018/0248238 A1 | 8/2018 | Pinon | |
| 2018/0269548 A1 | 9/2018 | Chi et al. | |
| 2019/0115639 A1* | 4/2019 | Marjanovic | H01M 10/613 |
| 2019/0148799 A1* | 5/2019 | Lim | H01M 10/482 429/120 |

FOREIGN PATENT DOCUMENTS

| | | |
|---|---|---|
| JP | 2012-18915 A | 1/2012 |
| JP | 2014-229559 A | 12/2014 |
| KR | 10-2013-0086678 A | 8/2013 |
| KR | 10-2013-0110400 A | 10/2013 |
| KR | 10-2014-0037351 A | 3/2014 |
| KR | 10-2014-0039350 A | 4/2014 |
| KR | 10-2014-0102610 A | 8/2014 |
| KR | 10-2014-0110233 A | 9/2014 |
| WO | WO 2011/089121 A1 | 7/2011 |

OTHER PUBLICATIONS

International Search Report issued in PCT/KR2016/010099 (PCT/ISA/210), dated Dec. 23, 2016.

* cited by examiner

BATTERY MODULE HAVING IMPROVED COOLING PERFORMANCE

CROSS REFERENCE TO RELATED APPLICATIONS

This application is a Continuation of application Ser. No. 15/555,741, filed on Sep. 5, 2017, which is the National Phase under 35 U.S.C. § 371 of International Application No. PCT/KR2016/010099, filed on Sep. 8, 2016, which claims the benefit under 35 U.S.C. § 119(a) to Patent Application No. 10-2015-0127129, filed in the Republic of Korea on Sep. 8, 2015, all of which are hereby expressly incorporated by reference into the present application.

TECHNICAL FIELD

The present disclosure relates to a battery module, and in particular, to a water-cooling-type battery module having high thermal conduction efficiency and high structural stability.

BACKGROUND ART

Secondary batteries, which are easily applicable according to production group and have electrical characteristics, such as a high energy density, have widely been used not only for portable devices but also for electric vehicles (EVs) or hybrid electric vehicles (HEVs), which are driven by an electric drive source, and energy storage systems. The secondary batteries not only have a primary advantage of remarkably reducing the use of fossil fuels, but also generate no by-products due to the use of energy. Thus, the secondary batteries have attracted attention as a new energy source for enhancing eco-friendliness and energy efficiency.

A battery pack applied to the EVs has a structure in which a plurality of cell assemblies including a plurality of unit cells are connected in series, in order to obtain high power. Also, each of the unit cells includes positive and negative electrode current collectors, a separator, an active material, and an electrolyte solution, and may be repeatedly charged and discharged by an electrochemical reaction between components.

In recent years, with the increasing necessity for a large-capacity structure that can also be used as an energy storage source, a demand for a multi-module battery pack in which a plurality of battery modules, each of which includes a plurality of secondary batteries connected in series and/or in parallel, is assembled has increased.

Since the multi-module battery pack is manufactured such that a plurality of secondary batteries are closely packed in a narrow space, it is important to easily discharge heat generated in each of the secondary batteries. Since a process of charging or discharging the secondary battery is enabled by the electrochemical reaction as described above, if heat of the battery module generated in the charging/discharging process is not effectively removed from the battery module, heat accumulation occurs. As a result, deterioration of the battery module may be promoted and, in some cases, ignition or explosion may occur.

Therefore, a high-output large-capacity battery module or a battery pack including the battery module necessarily requires a cooling device configured to cool battery cells embedded in the battery module or battery pack.

In general, since an amount of power that can be produced by one battery cell is not large, a commercially available battery module includes a stack in which a required number of battery cells are stacked. In order to appropriately maintain a temperature of the battery module by cooling heat generated during the production of electricity in a unit battery cell, cooling fins are inserted between the battery cells. The cooling fins, which have absorbed heat in each unit cell, transmit the heat to a cooling plate and, and the cooling plate is cooled by a heat sink.

However, a conventional battery module has a limitation in that heat generated in a battery cell cannot be smoothly discharged to the outside due to a low thermal conductivity of the battery module. For example, in the conventional battery module, due to an assembling tolerance between cooling fins and a cooling plate that are fastened to cartridges, the cooling fins do not completely contact the cooling plate and many portions are lifted, so a thermal contact resistance at a contact surface between the cooling fins and the cooling plate is considerably high. Particularly, referring to FIG. 1, when a battery cell 1 swells due to a rise in temperature, an expansion pressure of the battery cell 1 is transmitted to a cooling fin 2 so that contact performance between the cooling fin and a cooling plate may further deteriorate.

DISCLOSURE

Technical Problem

The present disclosure is designed to solve the problems of the related art, and therefore the present disclosure is directed to providing a water-cooling-type battery module having better cooling performance than in a conventional case by reducing thermal contact resistance. In particular, the present disclosure provides a structurally stable battery module in which contact between cooling fins and a cooling plate may be maintained even when a battery cell swells.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a cooling plate provided in a plate shape and including a plurality of slits at respective predetermined positions, a plurality of battery cells uprightly disposed parallel to one another in one direction on the cooling plate, and a plurality of cooling fins, each of which has a wall surface uprightly disposed over the cooling plate to come into contact with one surface of the battery cell and a lower flange integrally formed with the wall surface and disposed through the slit of the cooling plate to come into contact with a bottom surface of the cooling plate. The plurality of cooling fins are spaced apart by a predetermined distance from one another and arranged between the plurality of battery cells.

The battery module may further include a heat sink having a hollow structure disposed on a bottom surface of the cooling plate, and the heat sink may have a flow path through which a coolant flows.

At least a portion of the lower flange of the cooling fin may be between the bottom surface of the cooling plate and a top surface of the heat sink.

The lower flange of the cooling fin may include a plurality of unit lower flanges into which the lower flange is divided along a lengthwise direction of the cooling fin. The slits of the cooling plate may be configured to correspond one-to-one to the unit lower flanges, respectively, such that the unit lower flanges are individually passed through the slits of the cooling plate.

The cooling plate may include a plurality of protrusions convexly protruding from a flat top surface thereof. The plurality of protrusions may be provided at equal intervals along a lateral direction or a longitudinal direction.

The plurality of cooling fins may be grouped so that each group has two cooling fins, and the cooling fins in the same group are uprightly disposed such that the wall surfaces of the cooling fins are in contact with each other on one protrusion, and the lower flanges of the cooling fins in the same group may extend in symmetrical directions to each other and surround the protrusion.

Distal ends of the lower flanges of neighboring cooling fins in the same group may be respectively in contact with each other on the bottom surface of the cooling plate.

The cooling plate may be bonded or welded to the plurality of cooling fins and integrally formed with the plurality of cooling fins.

The cooling plate and the cooling fins may be composed of a thermally conductive metal material.

In another aspect of the present disclosure, there is also provided a battery pack including the above-described battery module.

In another aspect of the present disclosure, there is also provided a vehicle including the battery pack.

Advantageous Effects

According to an aspect of the present disclosure, even when a battery cell swells, a contact state between cooling fins and a cooling plate can be maintained so that cooling performance can be maintained.

According to another aspect of the present disclosure, lower flanges of the cooling fins can be in direct contact with a heat sink, thereby further increasing cooling efficiency.

MODE FOR DISCLOSURE

Figure 1:
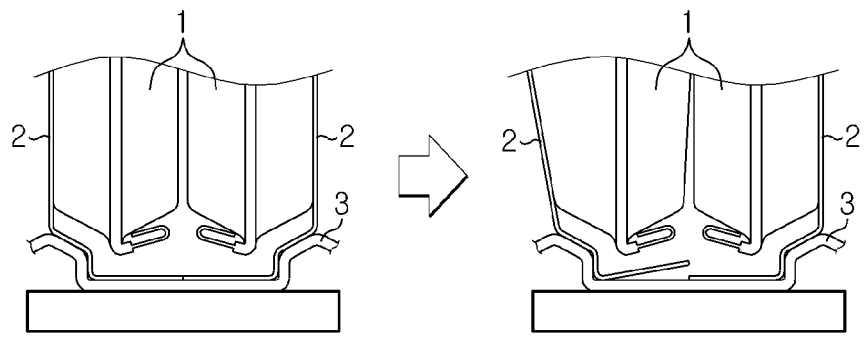
FIG. 1 is a schematic cross-sectional view of a contact structure between cooling fins and a cooling plate in a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Specific descriptions of well-known components and functions may be omitted so as to unnecessary obscure embodiments of the present disclosure.

The embodiments of the present disclosure are provided to fully convey the concept of the present disclosure to one skilled in the art, so that shapes and sizes of components in the drawings may be exaggerated, omitted, or schematically illustrated for clarity. Thus, a size or ratio of each component does not totally reflect an actual size or ratio.

Figure 2:
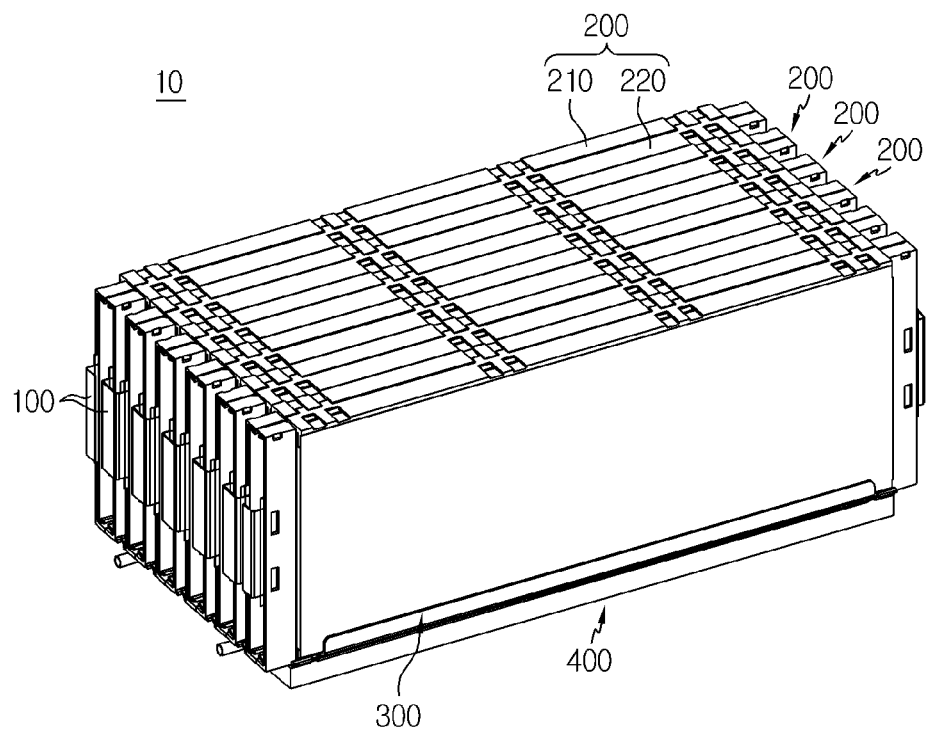
FIG. 2 is a schematic perspective view of configuration of a battery module according to an embodiment of the present disclosure.
Figure 3:
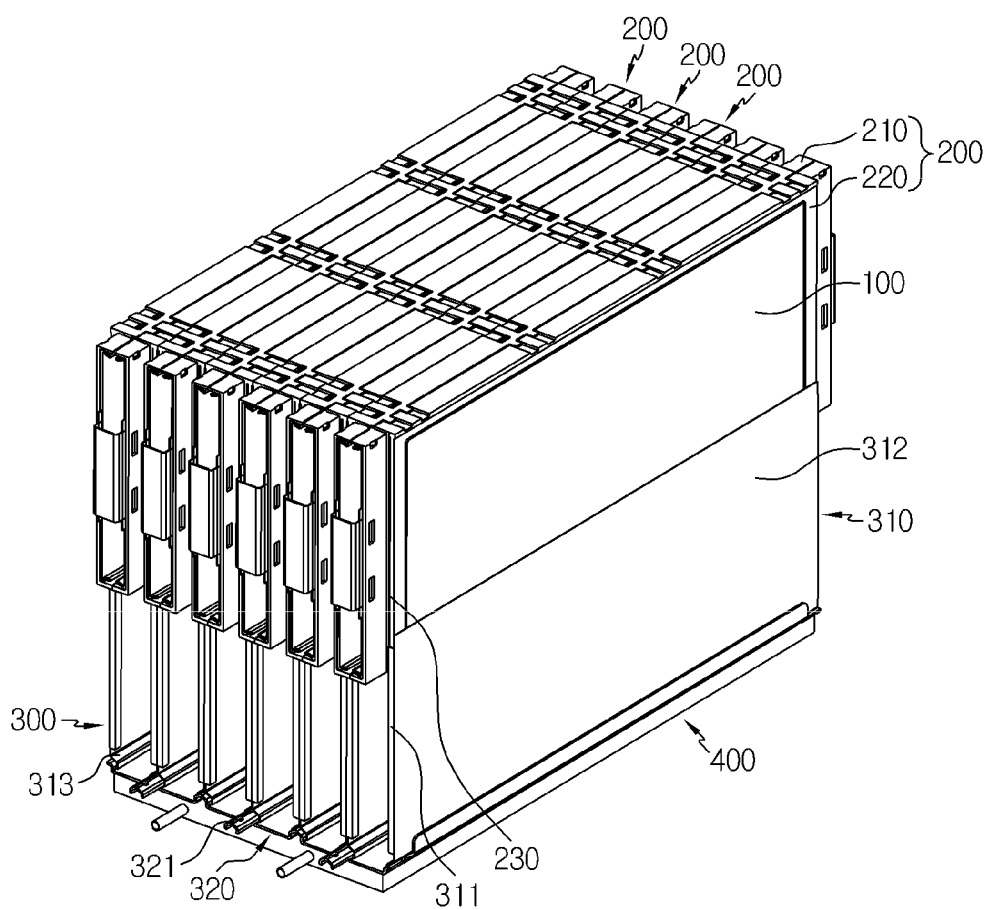
FIG. 3 is a perspective view of a state in which cell cartridges are partially inserted into a lower housing according to an embodiment of the present disclosure.

FIG. 2 is a schematic perspective view of configuration of a battery module according to an embodiment of the present disclosure. FIG. 3 is a perspective view of a state in which cell cartridges are partially inserted into a lower housing according to an embodiment of the present disclosure.

Referring to FIGS. 2 and 3, a battery module 10 according to an embodiment of the present disclosure includes a battery cell 100, a cell cartridge 200, and a lower housing 300.

A plurality of battery cells 100 may be provided. Also, the battery cell 100 may be a pouch-type secondary battery. The pouch-type secondary battery may include an electrode assembly, an electrolyte, and a pouch external member.

The electrode assembly may be configured such that at least one positive electrode plate and at least one negative electrode plate are disposed with a separator therebetween. More specifically, electrode assemblies may be divided into a winding type in which one positive electrode plate and one negative electrode plate are wound together with a separator and a stacking type in which a positive electrode plate and a negative electrode plate are alternately stacked with a separator therebetween.

The pouch external member is a laminate sheet including a resin layer and a metal layer and may be configured to be sealed by thermally fusing an outer circumferential surface of the pouch external member with the electrode assembly and the electrolyte embedded therein. Specifically, the pouch external member may include two laminate sheets, and a concave inner space may be formed in at least one of the two laminate sheets. The electrode assembly may be accommodated in an inner space of a pouch. Also, the pouch external member may be hermetically sealed by thermally fusing edge portions of the two laminate sheets with the electrode assembly contained therein.

Each of the electrode plates of the electrode assembly includes an electrode tab, and at least one electrode tab may be connected to an electrode lead. Also, the electrode lead is interposed between thermal fusing portions of two pouches and exposed to the outside of the pouch external member, and function as an electrode terminal of the battery cell 100. Since the pouch-type battery cell 100 has weak mechanical rigidity, the pouch-type battery cell 100 may be accommodated in the cell cartridge 200 so as to absorb external impact and facilitate stacking.

The cell cartridge 200 holds the battery cell 100 and prevents motion of the battery cell 100. Cell cartridges 200 are configured to be capable of being stacked and serve to guide the assembly of the battery cells 100.

One cell cartridge 200 may be configured to accommodate at least one battery cell 100. Each of the cell cartridges 200 of the present embodiment is configured to accommodate two battery cells 100. For example, the cell cartridge 200 includes first and second frames 210 and 220, each of which is provided in the form of a rectangular frame having an empty central portion. The first frame 210 and the second frame 220 may be provided to be capable of being assembled with each other with two battery cells 100 therebetween.

Specifically, after two battery cells 100 are stacked on the first frame 210, the first frame 210 may be then covered with the second frame 220, and the first and second frames 210 and 220 may be hooked to each other. In this case, one surface of each of the two battery cells 100 may be exposed to the outside through the empty central portion. Also, a size of the central portion of each of the first and second frames 210 and 220 may be a size corresponding to the electrode assembly of the pouch-type secondary battery. The cell cartridge 200 may be manufactured by using reinforced plastics having light weight and good mechanical rigidity.

The lower housing 300 provides a space where a plurality of cell cartridges 200 may be stacked in one direction, and serves to discharge heat of the battery cells 100 to the outside.

Figure 4:
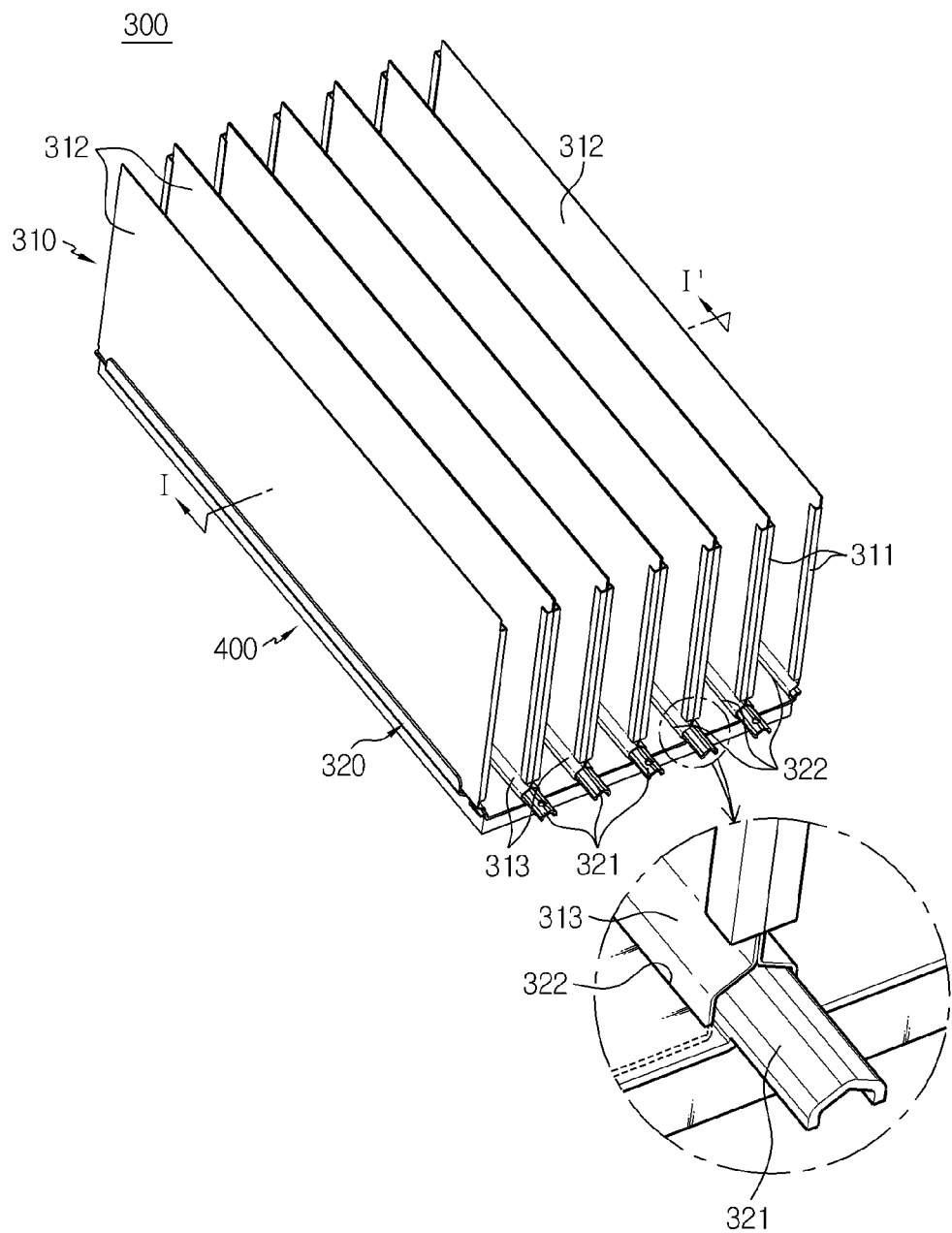
FIG. 4 is a perspective view of the lower housing of FIG. 3.
Figure 5:
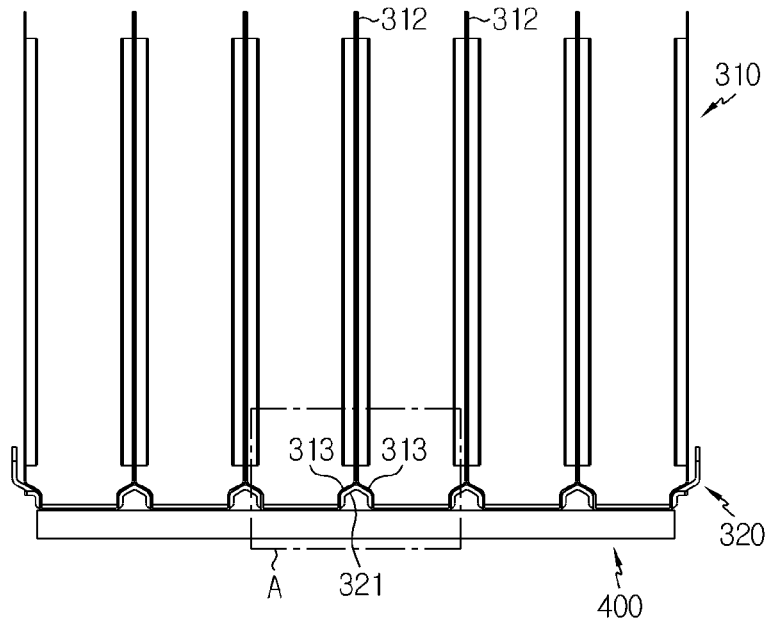
FIG. 5 is a cross-sectional view taken along a line of FIG. 4.
Figure 6:
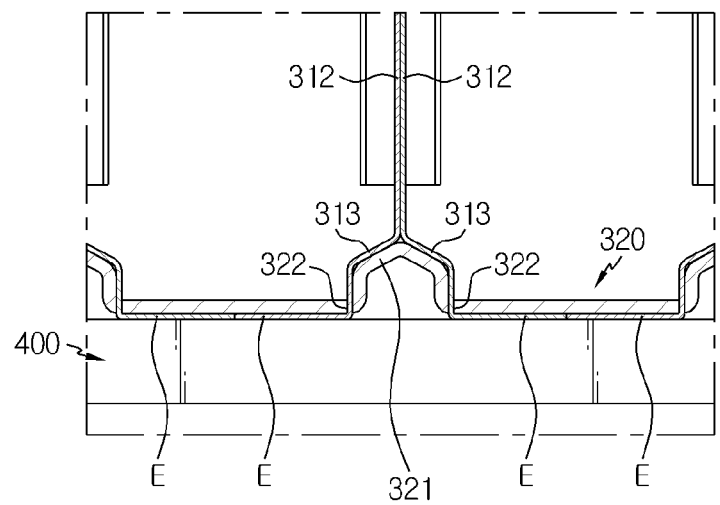
FIG. 6 is an enlarged view of a region A of FIG. 5.

FIG. 4 is a perspective view of the lower housing 300 of FIG. 3. FIG. 5 is a cross-sectional view taken along a line I-I' of FIG. 4. FIG. 6 is an enlarged view of a region A of FIG. 5.

Referring to FIG. 4, the lower housing 300 includes a plurality of cooling fins 310 and a cooling plate 320.

To begin with, each of the cooling fins 310 includes a wall surface 312 uprightly disposed on the cooling plate 320 to come into contact with one surface of the battery cell 100, and a lower flange 313 formed integrally with the wall surface 312 and disposed through a slit 322 of the cooling plate 320 to come into contact with a bottom surface of the cooling plate 320.

A plurality of cooling fins 310 are provided. As shown in FIGS. 4 and 5, wall surfaces 312 of the plurality of cooling fins 310 may be uprightly disposed parallel to one another in one direction on the cooling plate 320.

The cell cartridges 200 may be uprightly disposed between the plurality of cooling fins 310. For example, as shown in FIG. 3, the cell cartridges 200 may be disposed in spaces between the cooling fins 310 in such a manner that the cell cartridges 200 are fitted from top to bottom. In this case, since a central portion of the cell cartridge 200 is empty, one surface of each of the battery cells 100 may be naturally brought into contact with the wall surface 312 of the cooling fin 310. Since one wide surface of the pouch external member is in surface contact with the wall surface 312 of the cooling fin 310, heat generated during the charging and discharging of the battery cell 100 may be discharged to the outside through the cooling fin 310.

The lower flange 313 of the cooling fin 310 is a portion that contacts the cooling plate 320. By bonding or welding the lower flange 313 of the cooling fin 310 and the cooling plate 320, thermal contact resistance therebetween may be reduced.

In particular, the lower flange 313 of the cooling fin 310 may be in contact with the bottom surface of the cooling plate 320 through the slit 322 of the cooling plate 320. This will be described in further detail below.

Cartridge assembly guide units 311 may be provided at both end portions of the cooling fin 310. The cartridge assembly guide unit 311 may be bent toward the inside of the cooling fin 310. Also, a slot 230 may be further provided in the cell cartridge 200 in a direction in which the cell cartridge 200 is inserted between the cooling fins 310. The slot 230 and the cartridge assembly guide unit 311 are slidably coupled to each other so that the cell cartridge 200 may be inserted and fixed in the space between the cooling fins 310.

The cooling fins 310 may be composed of a metal material. The metal material may be, but not limited to, an aluminum alloy having a high thermal conductivity and a light weight among metals. For example, copper, gold, or silver may be used. In addition to the metals, ceramic materials, such as aluminum nitride and silicon carbide, may also be used.

The cooling plate 320 has a plate shape and provides a place where the plurality of cooling fins 310 and the battery cells 100 are uprightly disposed.

The cooling plate 320 includes a plurality of protrusions 321 convexly protruding from a flat top surface. The plurality of protrusions 321 may be arranged at equal intervals in a lateral direction or a longitudinal direction.

The cell cartridges 200 may be uprightly disposed between the protrusions 321. In this case, a distance between the protrusions 321 may correspond to a width of a lower end of the cell cartridge 200. Accordingly, the lower end of the cell cartridge 200 may be supported by sides of the protrusions 321 on both sides of the cell cartridge 200.

The cooling plate 320 having a concavo-convex structure may be advantageous for increasing fixing force of the cell cartridge 200 during the assembly of the cell cartridge 200.

In addition, the protrusion 321 may provide a space such that a cable (not shown) is located under the cooling plate 320. That is, since various cables may be located through the space under the protrusion 321, the cables may be easily wired without being exposed to the outside, thereby preventing damage to the cables.

Furthermore, since the cooling plate 320 has a larger sectional area for absorbing heat than when the cooling plate 320 has a flat surface, heat capacity may further increase. Accordingly, the cooling plate 320 may absorb and discharge a large amount of heat from the battery cells 100.

The cooling plate 320 may be composed of a thermally conductive metal plate that is the same as or similar to the cooling fin 310.

A heat sink 400 may be further provided under the cooling plate 320. The heat sink 400 serves to cool the cooling plate 320. Here, the heat sink 400 refers to an object that absorbs heat from another object by thermal contact and emits heat. For example, the heat sink 400 may have a hollow structure including an internal flow path, and a coolant, such as cooling water, a cooling gas, and air, may flow in the internal flow path.

Hereinafter, a coupling structure between the plurality of cooling fins 310 and the cooling plate 320 will be described in further detail below.

To begin with, referring to FIGS. 4 to 6, the plurality of cooling fins 310 of the present embodiment may be grouped so that each group has two cooling fins 310. The cooling fins 310 in the same group are uprightly disposed such that the wall surfaces 312 are in contact with each other on one protrusion 321, and the respective lower flanges 313 may extend in symmetrical directions to each other and surround the protrusion 321. Naturally, the cooling fins 310 in the same group may be integrally formed with each other.

The cooling plate 320 has a plurality of slits 322 at respective predetermined positions. The predetermined positions may be portions of left and right boundary lines of the protrusion 321 with respect to the protrusion 321. Also, the slit 322 may be configured such that the lower flange 313 may be forcibly inserted into the slit 322. That is, a gap between the cooling fin 310 and the cooling plate 320 may be minimized.

As shown in FIGS. 5 and 6, the lower flange 313 of the cooling fin 310 is in contact with the bottom surface of the cooling plate 320 through the slit 322 of the cooling plate 320. Distal ends E of the lower flanges 313 of each group of cooling fins 310 are respectively in contact with distal ends E of the lower flanges 313 of neighboring groups of cooling fins 310 on the bottom surface of the cooling plate 320. For example, the cooling fin 310 is prepared with the distal end E of the lower flange 313 unfolded. Also, the distal end E of the lower flange 313 is passed through the slit 322 of the cooling plate 320, bent parallel to the bottom surface of the cooling plate 320, and fixed to the bottom surface of the cooling plate 320 by using a bonding or welding process.

Due to the coupling structure between the lower flange 313 of the cooling fin 310 and the cooling plate 320 according to the present disclosure, adhesion between the cooling fins 310 and the cooling plate 320 may be reinforced more than in the conventional case. Thus, a thermal contact resistance between the cooling fins 310 and the cooling plate 320 may be reduced to increase thermal conductivity.

In particular, even if the wall surface 312 of the cooling fin 310 is deformed and swells due to an expansion pressure of the battery 100 during the swelling of the battery cell 100, at least the lower flange 313 of the cooling fin 310 may remain closely adhered to the bottom surface of the cooling plate 320.

In this case, even when the battery cells 100 swells, contact between the lower flange 313 of the cooling fin 310 and the cooling plate 320 may be maintained. Thus, cooling performance of the battery module 10 may not be degraded, thereby preventing the swelling of the battery cell 100 from further worsening.

The distal end E of the lower flange 313 of the cooling fin 310 may be interposed between the cooling plate 320 and the heat sink 400. For example, as shown in FIG. 6, the distal end E of the lower flange 313 of the cooling fin 310 may be interposed between the bottom surface of the cooling plate 320 and a top surface of the heat sink 400 so that contact between the cooling plate 320 and the heat sink 400 may be further stable.

Furthermore, in this case, since the distal end E of the lower flange 313 of the cooling fin 310 is brought into direct contact with the heat sink 400, cooling performance may be further improved.

Figure 7:
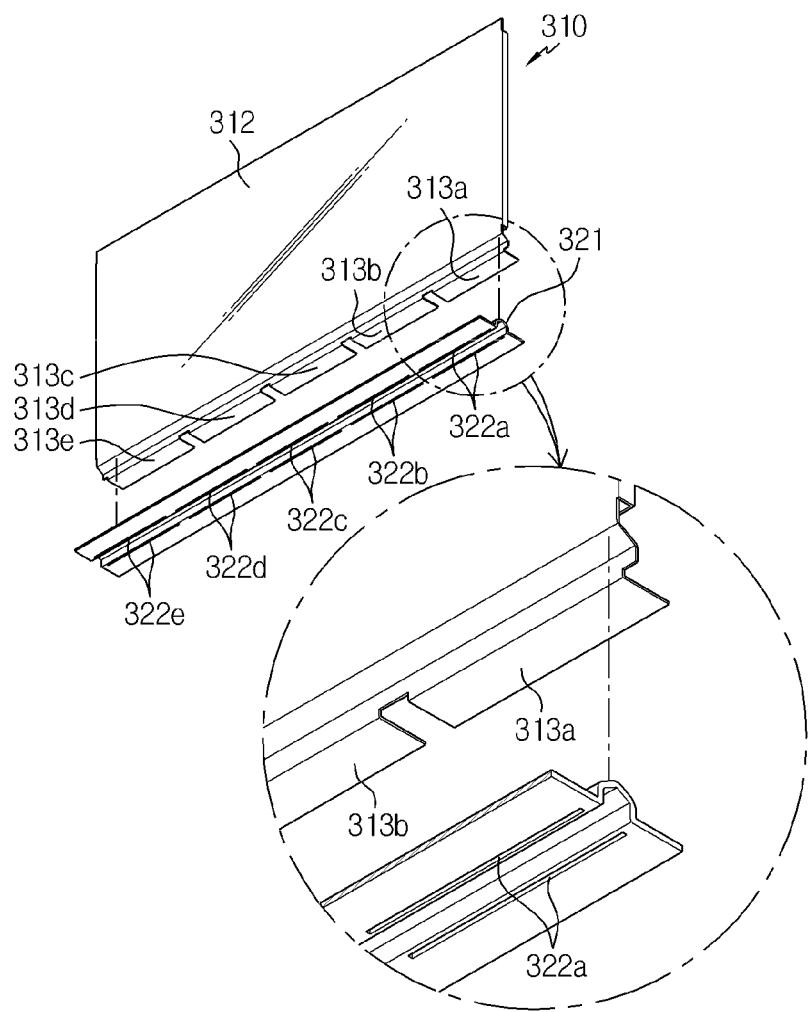
FIGS. 7 and 8 are schematic partial perspective views of states before and after coupling cooling fins to a cooling plate, according to another embodiment of the present disclosure.
Figure 8:
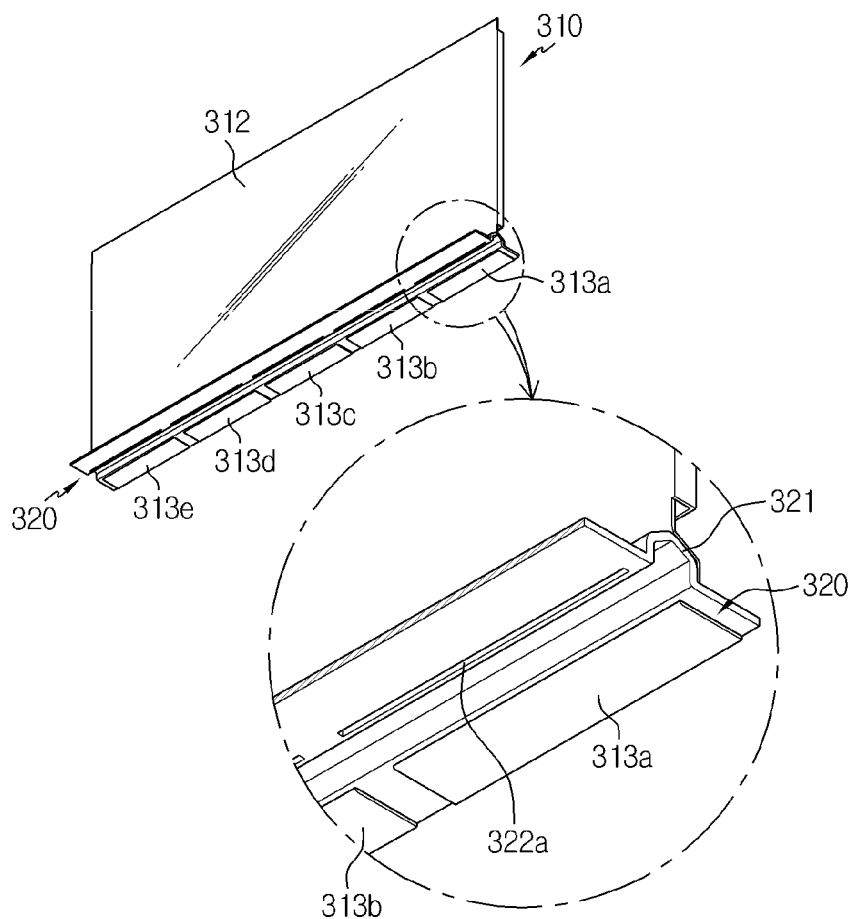
Figure 9:
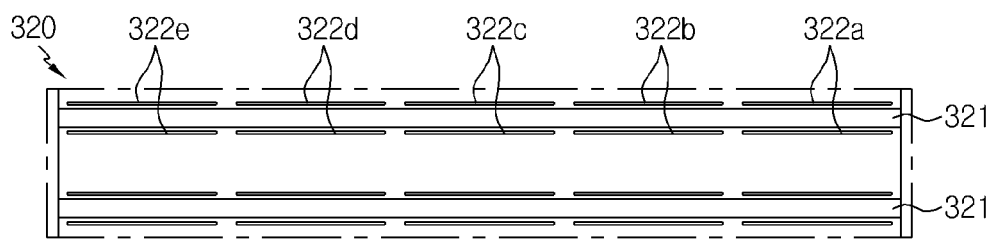
FIG. 9 is a plan view of a portion of the cooling plate of FIG. 7.

FIGS. 7 and 8 are schematic partial perspective views of states before and after coupling cooling fins to a cooling plate, according to another embodiment of the present disclosure. FIG. 9 is a plan view of a portion of the cooling plate of FIG. 7.

Hereinafter, a battery module according to another embodiment of the present disclosure will be described with reference to FIGS. 7, 8, and 9. The same reference numerals are used to denote the same reference elements as in the drawings of the above-described embodiment. The same descriptions of the same elements will be omitted, and differences between the present embodiment and the above-described embodiment will mainly be described.

Referring to FIGS. 7 to 9, the lower flange 313 of the cooling fin 310 according to another embodiment of the present disclosure includes a plurality of unit lower flanges 313a to 313e into which the lower flange 313 is divided along a lengthwise direction of the cooling fin 310. Also, slits 322a to 322e of the cooling plate 320 are configured to correspond one-to-one to the unit lower flanges 313, respectively.

For example, as shown in FIG. 9, the slits 322a to 322e of the cooling plate 320 of the present embodiment may be divided in a lateral direction as well as in a longitudinal direction (a direction in which the cooling fins 310 are arranged). Also, one cooling fin 310 includes the plurality of unit lower flanges 313a to 313e by cutting the distal end E of the lower flange 313 into several portions. The unit lower flanges 313a to 313e may be individually forcibly inserted into the slits 322a to 322e that are divided in the lateral direction.

According to the configuration, mechanical rigidity of the cooling plate 320 may increase more than in a case in which the slit 322 is not divided in the lateral direction. Accordingly, even if the battery module 10 of the present embodiment is exposed to external impact or vibration, coupling force and contact performance between the cooling plate 320 and the cooling fins 310 may be stably ensured.

A battery pack according to the present disclosure may include at least one battery module as described above according to the present disclosure. In addition to the battery module, the battery pack according to the present disclosure may further include a case configured to cover the battery module and various devices configured to control the charging and discharging of the battery module, for example, a battery management system (BMS), a current sensor, and a fuse.

A battery pack according to the present disclosure may be applied to vehicles, such as electric vehicles or hybrid vehicles. That is, a vehicle according to the present disclosure may include the battery module according to the present disclosure.

As described above, while the present disclosure has been particularly shown and described with reference to exemplary embodiments thereof, it will be understood by those of ordinary skill in the art that it is capable of various changes and modifications without departing from the scope of the present disclosure as defined by the following claims.

In the present specification, direction-indicating terms, such as "upper side", "lower side", "left side", "right side", "front side", and "back side", may be used herein for ease of description to describe the present disclosure, and be used interchangeably depending on a position of an object or an observer's position.

What is claimed is:

1. A battery module comprising:
   a cooling plate provided in a plate shape and including a plurality of slits at respective predetermined positions;
   a plurality of battery cells uprightly disposed parallel to one another in one direction on the cooling plate; and
   a plurality of cooling fins, each cooling fin having a wall surface uprightly disposed over the cooling plate to come into contact with one surface of the battery cell and a lower flange integrally formed with the wall surface and disposed through the slit of the cooling plate to come into contact with a bottom surface of the cooling plate, the plurality of cooling fins spaced apart by a predetermined distance from one another and arranged between the plurality of battery cells.

2. The battery module of claim 1, further comprising a heat sink having a hollow structure disposed on a bottom surface of the cooling plate, the heat sink having a flow path through which a coolant flows.

3. The battery module of claim 2, wherein at least a portion of the lower flange of the cooling fin is between the bottom surface of the cooling plate and a top surface of the heat sink.

4. The battery module of claim 1, wherein the lower flange of the cooling fin comprises a plurality of unit lower flanges into which the lower flange is divided along a lengthwise direction of the cooling fin, and
wherein the slits of the cooling plate are configured to correspond one-to-one to the unit lower flanges, respectively, such that the unit lower flanges are individually passed through the slits of the cooling plate.

5. The battery module of claim 1, wherein the cooling plate comprises a plurality of protrusions convexly protruding from a flat top surface thereof, and
wherein the plurality of protrusions are provided at equal intervals along a lateral direction or a longitudinal direction.

6. The battery module of claim 1, wherein the cooling plate is bonded or welded to the plurality of cooling fins and integrally formed with the plurality of cooling fins.

7. The battery module of claim 1, wherein the cooling plate and the cooling fins are composed of a thermally conductive metal material.

8. A battery module comprising:
a cooling plate provided in a plate shape and including a plurality of slits at respective predetermined positions;
a plurality of battery cells uprightly disposed parallel to one another in one direction over the cooling plate;
a plurality of cooling fins, each cooling fin including a wall surface uprightly disposed over the cooling plate to come into contact with one surface of the battery cell and a lower flange integrally formed with the wall surface and disposed through the slit of the cooling plate to come into contact with a bottom surface of the cooling plate, the plurality of cooling fins spaced apart by a predetermined distance from one another and arranged between the plurality of battery cells; and
a heat sink having a hollow structure disposed on the bottom surface of the cooling plate, the heat sink having a flow path through which a coolant flows,
wherein at least a portion of the lower flange of the cooling fin is in contact with both the bottom surface of the cooling plate and a top surface of the cooling plate.

9. The battery module of claim 8, wherein the lower flange of the cooling fin comprises a plurality of unit lower flanges into which the lower flange is divided along a lengthwise direction of the cooling fin, and
wherein the slits of the cooling plate are configured to correspond one-to-one to the upper lower flanges, respectively, such that the unit lower flanges are individually passed through the slits of the cooling plate.

10. The battery module of claim 8, wherein the cooling plate comprises a plurality of protrusions convexly protruding from a flat top surface thereof, and
wherein the plurality of protrusions are provided at equal intervals along a lateral direction or a longitudinal direction.

11. A battery module comprising:
a cooling plate provided in a plate shape and including a plurality of slits at respective predetermined positions;
a plurality of battery cells uprightly disposed parallel to one another in one direction over the cooling plate;
a plurality of cooling fins, each cooling fin including a wall surface uprightly disposed over the cooling plate to come into contact with one surface of the battery cell and a lower flange integrally formed with the wall surface and disposed through the slit of the cooling plate to come into contact with a bottom surface of the cooling plate, the plurality of cooling fins spaced apart by a predetermined distance from one another and arranged between the plurality of battery cells; and
a heat sink having a hollow structure disposed on the bottom surface of the cooling plate, the heat sink having a flow path through which a coolant flows,
wherein at least a portion of the lower flange of the cooling fin is in contact with both the bottom surface of the cooling plate and a top surface of the cooling plate,
wherein the cooling plate comprises a plurality of protrusions convexly protruding from a flat top surface thereof,
wherein the plurality of protrusions are provided at equal intervals along a lateral direction or a longitudinal direction,
wherein the plurality of cooling fins are grouped so that each group has two cooling fins, and the cooling fins in the same group are uprightly disposed such that the wall surfaces of the cooling fins are in contact with each other on one protrusion, and the lower flanges of the cooling fins in the same group extend in symmetrical directions to each other and surround the protrusion, and
wherein distal ends of the lower flanges of neighboring cooling fins in the same group are respectively in contact with each other on the bottom surface of the cooling plate.

12. A battery pack comprising the battery module of claim 1.